(12) United States Patent
Knappe et al.

(10) Patent No.: US 11,960,247 B2
(45) Date of Patent: Apr. 16, 2024

(54) ATOMIC CLOCKS AND RELATED METHODS

(71) Applicant: The Regents of the University of Colorado, Denver, CO (US)

(72) Inventors: Svenja Knappe, Boulder, CO (US); Sean Krzyzewski, Albuquerque, NM (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 0 days.

(21) Appl. No.: 18/197,473

(22) Filed: May 15, 2023

(65) Prior Publication Data

US 2023/0384737 A1    Nov. 30, 2023

Related U.S. Application Data

(63) Continuation of application No. 17/366,808, filed on Jul. 2, 2021, now abandoned.

(60) Provisional application No. 63/047,334, filed on Jul. 2, 2020.

(51) Int. Cl.
    *G04F 5/14*     (2006.01)
    *G02B 5/20*     (2006.01)
    *G04F 5/04*     (2006.01)

(52) U.S. Cl.
    CPC ............ *G04F 5/14* (2013.01); *G04F 5/04* (2013.01); *G04F 5/145* (2013.01); *G02B 5/20* (2013.01); *G02B 5/202* (2013.01)

(58) Field of Classification Search
    CPC ... G04F 5/14; G04F 5/04; G04F 5/145; G02B 5/202; G02B 5/20

USPC .................................................... 331/3, 94.1
    See application file for complete search history.

(56) References Cited

U.S. PATENT DOCUMENTS

| 4,862,101 A | 8/1989 | Emmons |
| 8,384,894 B2 | 2/2013 | Fink et al. |
| 2013/0003766 A1 | 1/2013 | Savchnkov et al. |

(Continued)

OTHER PUBLICATIONS

Gerginov, V., et al., Long-term frequency instability of atomic frequency references based on coherent population trapping and microfabricated vapor cells. Journal of the Optical Society of America B, 2006. 23(4): p. 593-597.

(Continued)

*Primary Examiner* — Arnold M Kinkead
(74) *Attorney, Agent, or Firm* — Meunier Carlin & Curfman LLC

(57) ABSTRACT

According to some aspects of the present disclosure, an atomic clock and methods of forming and/or using an atomic clock are disclosed. In one embodiment, an atomic clock includes: a light source configured to illuminate a resonance vapor cell; a narrowband optical filter disposed between the light source and the resonance vapor cell and arranged such that light emitted from the light source passes through the narrowband optical filter and illuminates the resonance vapor cell. The resonance vapor cell is configured to emit a signal corresponding to a hyperfine transition frequency in response to illumination from the light source, and a filter cell is disposed between the light source and the resonance vapor cell and configured to generate optical pumping. An optical detector is configured to detect the emitted signal corresponding to the hyperfine transition frequency.

14 Claims, 4 Drawing Sheets

(56) References Cited

U.S. PATENT DOCUMENTS

2015/0358026 A1 12/2015 Gan

OTHER PUBLICATIONS

Venkatraman, V., et al. LTCC integrated miniature Rb discharge lamp module for stable optical pumping in miniature atomic clocks and magnetometers. in Design and Technology in Electronic Packaging (SIITME), 2012 IEEE 18th International Symposium for. 2012.

Knappe, S., et al., Atomic vapor cells for chip-scale atomic clocks with improved long-term frequency stability. Optics Letters, 2005. 30(18): p. 2351-2353.

Zhang, S., et al., Compact Rb optical frequency standard with 10-15 stability. Review of Scientific Instruments, 2017. 88(10): p. 103106.

Aldridge, L., P. L. Gould, and E.E. Eyler, Experimental isotope shifts of the 5 2S1/2 state and low-lying excited states of Rb. Physical Review A, 2011. 84(3): p. 034501.

Pellaton, M., et al., Study of laser-pumped double-resonance clock signals using a microfabricated cell. Physica Scripta, 2012. 2012(T149): p. 014013.

Knappe, S., et al., A microfabricated atomic clock. Applied Physics Letters, 2004. 85(9): p. 1460-1462.

ATOMIC CLOCKS AND RELATED METHODS

CROSS REFERENCE TO RELATED APPLICATIONS

This application is a continuation application of U.S. application Ser. No. 17/366,808, filed Jul. 2, 2021, which claims priority to and the benefit of U.S. Provisional Patent Application 63/047,334, filed Jul. 2, 2020, the disclosures of which are expressly incorporated herein by reference in their entireties.

BACKGROUND

Chip-scale atomic clocks (CSACs) can use vertical cavity surface emitting lasers (VCSELs) at different wavelengths, including 780 nm or 795 nm (for Rubidium) or 852 nm or 894 nm (for Cesium). These lasers can have very high tuning rates with current (0.5 nm/mA) and temperature (0.05 nm/K) and can require precise control to stabilize the laser wavelength and output power. The cost in implementing and disciplining VCSEL dies can be very high. Often, VCSEL dies need to be "burnt in" over many days, sometimes weeks, since their power change at a given wavelength with time causes large clock frequency drifts. For vapor cells there exist magic temperatures where the frequency shifts due to cell temperature changes are minimized with certain buffer-gas combinations. For VCSELs, such operating points can be difficult to find [1], and tight specifications are placed on the laser operating electronics. There often needs to be an intricate balance between laser power, laser frequency, modulation amplitudes, and sometimes cell temperature to maintain clock stability.

When lasers age in non-controlled ways, this balance can be difficult to maintain. In contrast, other critical components such as the oscillators or vapor cells have been mass produced at a lower cost. One alternative approach has been taken by the group of Gaetano Mileti in Switzerland, who tried to develop a MEMS Rubidium lamp [2]. While scientific demonstrations have been made, lifetime issues remain.

It is with respect to these and other considerations that the various aspects of the present disclosure are described herein.

SUMMARY

In some aspects, the present disclosure relates to atomic clocks which, in some embodiments, use light emitting diodes (LEDs) as a light source. Among other benefits and advantages, certain embodiments of the present disclosure can be constructed at lower cost than atomic clocks using conventional designs. According to some embodiments of the present disclosure, systems described herein can be used to implement chip scale atomic clocks.

In some aspects, the present disclosure relates to an atomic clock which, in one embodiment, includes a light source configured to illuminate a resonance vapor cell; a narrowband optical filter disposed between the light source and the resonance vapor cell and arranged such that light emitted from the light source passes through the narrowband optical filter and illuminates the resonance vapor cell, wherein the resonance vapor cell is configured to emit a signal corresponding to a hyperfine transition frequency in response to illumination from the light source; a filter cell disposed between the light source and the resonance vapor cell and configured to generate optical pumping; and an optical detector configured to detect the emitted signal corresponding to the hyperfine transition frequency.

In one embodiment, the light source comprises a light emitting diode configured to illuminate the resonance vapor cell.

In one embodiment, the light source comprises a quantum dot laser configured to illuminate the resonance vapor cell.

In one embodiment, the filter cell is comprised at least partially of Rubidium.

In one embodiment, the resonance vapor cell is comprised at least partially of Rubidium or Cesium.

In one embodiment, wherein the atomic clock is configured as a chip-scale atomic clock.

In some aspects, the present disclosure relates to an atomic clock which, in one embodiment, includes a light emitting diode or quantum dot laser, configured to illuminate a resonance vapor cell; a narrowband optical filter disposed between the light emitting diode or quantum dot and the resonance vapor cell and arranged such that light emitted from the light emitting diode or quantum dot laser passes through the narrowband optical filter and illuminates the resonance vapor cell, wherein the resonance vapor cell is configured to emit a signal corresponding to a hyperfine transition frequency in response to illumination from the light emitting diode or quantum dot laser; a filter cell disposed between the light source and the resonance vapor cell; and an optical detector configured to detect the emitted signal corresponding to the hyperfine transition frequency.

In one embodiment, the filter cell is comprised at least partially of Rubidium.

In one embodiment, the narrowband optical filter is disposed on a surface of the filter cell.

In one embodiment, wherein the resonance vapor cell is comprised at least partially of Rubidium or Cesium.

In one embodiment, the atomic clock is configured as a chip-scale atomic clock.

In one embodiment, the optical detector comprises a photodiode.

In some aspects, the present disclosure relates to a method relating to an atomic clock. In one embodiment, the method includes illuminating, by a light emitting diode or quantum dot laser, a resonance vapor cell, wherein the resonance vapor cell is configured to emit a signal corresponding to a hyperfine transition frequency in response to illumination from the light emitting diode or quantum dot laser; generating optical pumping by a filter cell disposed between the light source and the resonance vapor cell; filtering, by a narrowband optical filter, light emitted from the light emitting diode or quantum dot laser such that the emitted light passes through the narrowband optical filter and illuminates the resonance vapor cell; and detecting, by an optical detector, the emitted signal corresponding to the hyperfine transition frequency.

In one embodiment, the method includes applying a C field as a magnetic field to produce narrow magnetic resonance linewidth and produce clock stability through low drift clock signal.

In one embodiment, the method includes providing a magnetic shield that encompasses at least the light emitting diode or quantum dot laser, resonance vapor cell, narrowband optical filter, and optical detector, and wherein the magnetic shield is configured to minimize a magnetic field causing broadening or shifting of energy levels.

In one embodiment, the filter cell comprises at least partially of Rubidium.

In one embodiment, the resonance vapor cell is comprised at least partially of Rubidium.

In one embodiment, the resonance vapor cell is comprised at least partially Cesium.

In one embodiment, the optical detector comprises a photodiode.

In one embodiment the method includes forming an atomic clock that includes at least: the light emitting diode or quantum dot laser; the resonance vapor cell; the narrow-band optical filter; the filter cell; and the optical detector.

Other aspects and features according to the example embodiments of the present disclosure will become apparent to those of ordinary skill in the art, upon reviewing the following detailed description in conjunction with the accompanying figures.

BRIEF DESCRIPTION OF THE DRAWINGS

The accompanying figures, which are not necessarily drawn to scale, and which are incorporated in and constitute a part of this specification, illustrate several aspects described below.

DETAILED DESCRIPTION

Figure 1:
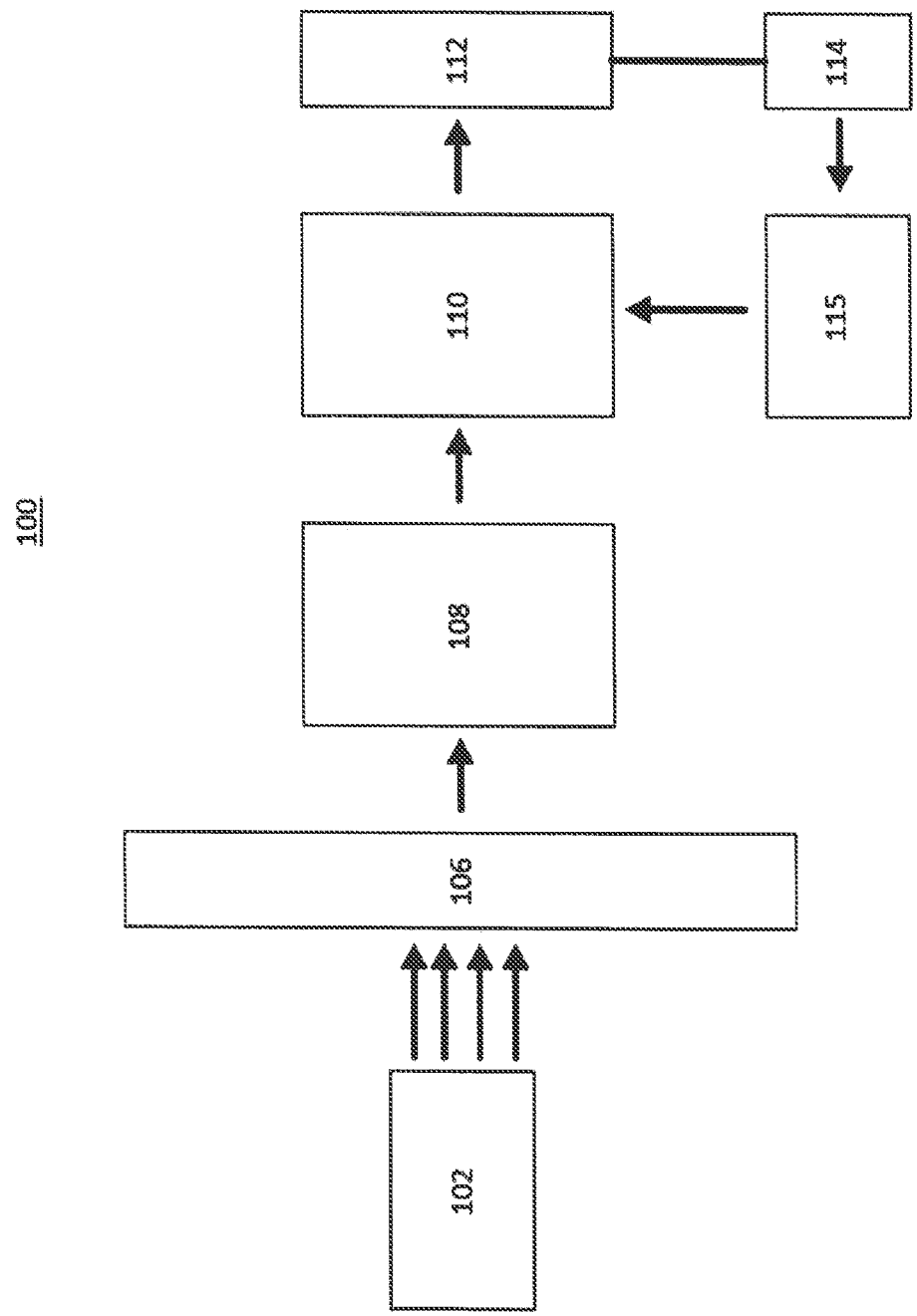
FIG. 1 shows a block diagram of components of an atomic clock in accordance with one embodiment of the present disclosure.

In some aspects, the present disclosure relates to atomic clocks and related methods. Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. For example, "[1]" refers to the 1st reference in the list, namely Gerginov, V., et al., *Long-term frequency instability of atomic frequency references based on coherent population trapping and microfabricated vapor cells*. Journal of the Optical Society of America B, 2006. 23(4): p. 593-597. All references cited and discussed in this specification are incorporated herein by reference in their entireties and to the same extent as if each reference was individually incorporated by reference.

A detailed description of certain example embodiments of the present disclosure will now be provided with reference to the accompanying drawings. The drawings form a part hereof and show, by way of illustration, specific embodiments and examples. In referring to the drawings, like numerals represent like elements throughout the several figures. Some experimental data may be presented herein for purposes of illustration and should not be construed as limiting the scope of the present disclosure in any way or excluding any alternative or additional embodiments.

FIG. 1 illustrates a block diagram of an embodiment of the present disclosure, configured to operate as a chip scale atomic clock (CSAC) 100. A light emitting diode (LED) 102 is used to excite transitions in a resonance vapor cell 110. The LED 102 can be configured such that at least part of the light produced by the LED passes through an optical filter 106. Optionally, the LED 102 can be comprised of multiple LEDs or an array of LEDs. LEDs can have inherently wide emission ranges (on the order of 10 nm full width at half maximum) with little variation in output power and spectrum and thus drift of the atomic vapor transition frequency may not be an issue. Different types of LEDs can be used. In some embodiments of the present disclosure, the spectral width for planar LEDs may be broad, resulting in a large proportion of the light being rejected by filtering, increased waste power. Other types and combinations of LEDs and LED arrays are contemplated by the present disclosure. For example, commercially-produced LEDs that emit at 421 nm, 780 nm and 795 nm may be used in embodiments of the present disclosure. The wavelengths of LEDs disclosed herein are intended as non-limiting examples, and the use of LEDs that emit at different wavelengths is contemplated. In some embodiments of the present disclosure, the type of LED affects the efficiency and/or power consumption of the atomic clock.

In some embodiments of the present disclosure, a quantum dot laser is used in combination with or in place of LEDs. A quantum dot laser can use quantum dots (nanometer-scale semiconductor particles) as an active laser medium. A quantum dot laser can be formed by forming a quantum well laser in which the quantum well layer includes quantum dots. Quantum dot lasers can include semiconductors in a tightly confined configuration that can act as a light source. The tight confinement and the quantum dot acting as a quantum well, the size or composition of the dot can be used to control the output wavelength. The quantum dot laser can therefore operate at different wavelengths from other semiconductor-based lasers.

Quantum dot lasers can exhibit high modulation bandwidth and low laser intensity noise needed for the clock, but can offer lower linewidths. They can have multiple GHz modulation rates, so they can also be used in a similar configuration as a standard coherent population trapping (CPT) clock such as the CSAC. LEDs and quantum dots would be used the same orientation and set up as an LED, the reduce the requirements on the spectral filtering.

As a non-limiting example, in some embodiments of the present disclosure, a quantum dot laser can be used with a size and material composition configured to emit light with a wavelength corresponding to the atomic transition of rubidium—421 nanometers. According to some embodiments of the present disclosure, quantum dot lasers can produce light with narrower linewidths than similar LEDs. An optical filter 106 can be configured and arranged such that light from the LED 102 passes through the optical filter 106 before reaching the filter cell 108. The optical filter 106 can be a passive optical bandpass filter. For example, in some embodiments of the present disclosure, the passive optical bandpass filter can be a narrowband optical filter with a nm width. Different types of optical filter 106 and different bandpass filter widths are contemplated by the present disclosure. The optical filter 106 can be located on the surface of the filter cell 108, or the optical filter 106 can be separate from the filter cell 108. The light filtered through the optical filter 106 passes through the filter cell 108 to illuminate the resonance cell 110. In some embodiments of the present disclosure, the filter cell 108 and resonance cell 110 include different isotopes of the same element, and those different isotopes can absorb light at different wavelengths. As a non-limiting example, the filter cell 108 can contain 85-Rb, which does not absorb light that is resonant with 87-Rb. The light that passes through the filter cell 108 can be light that is of a suitable wavelength to excite the resonance cell 110 containing 87-Rb. According to some embodiments of the present disclosure, the optical filter 106 and the filter cell 108 are configured to cause a specific transition between energy levels in the atoms of the resonance cell 110.

Throughout the present disclosure the term "fine structure" is used to refer to the interaction of the electron's magnetic moment with the electronics orbital angular momentum. Additionally, throughout the present disclosure the term "hyperfine structure" is used to refer to the interaction of the orbital angular momentum of the electron interacting with the spin of the nucleus. The filter cell 108 can be configured to enable optical pumping into a single hyperfine state, for example, F=2 for 87-Rb. The light from the filter cell 108 illuminates the resonance cell 110 and the optical detector 112. In some embodiments, the optical detector 112 is a photodiode. The resonance cell 110 and the filter cell 108 can contain different materials that are suitable for hyperfine optical pumping. For example, the resonance cell 110 and the filter cell 108 may contain different isotopes of Rubidium. In some embodiments, a single container can serve as the resonance cell 110 and the filter cell 108. The local oscillator 115 produces an RF field at the location of the resonance cell 110. If the frequency of the RF field matches the one of the atomic hyperfine transition, the light on the optical detector 112 changes.

A control and detection system 114 can determine the difference in frequency between the atomic hyperfine transition and the local oscillator 115 based on the output of the detector 112. It can then tune the local oscillator 115 to remain in resonance with the atomic transition.

Figure 2:
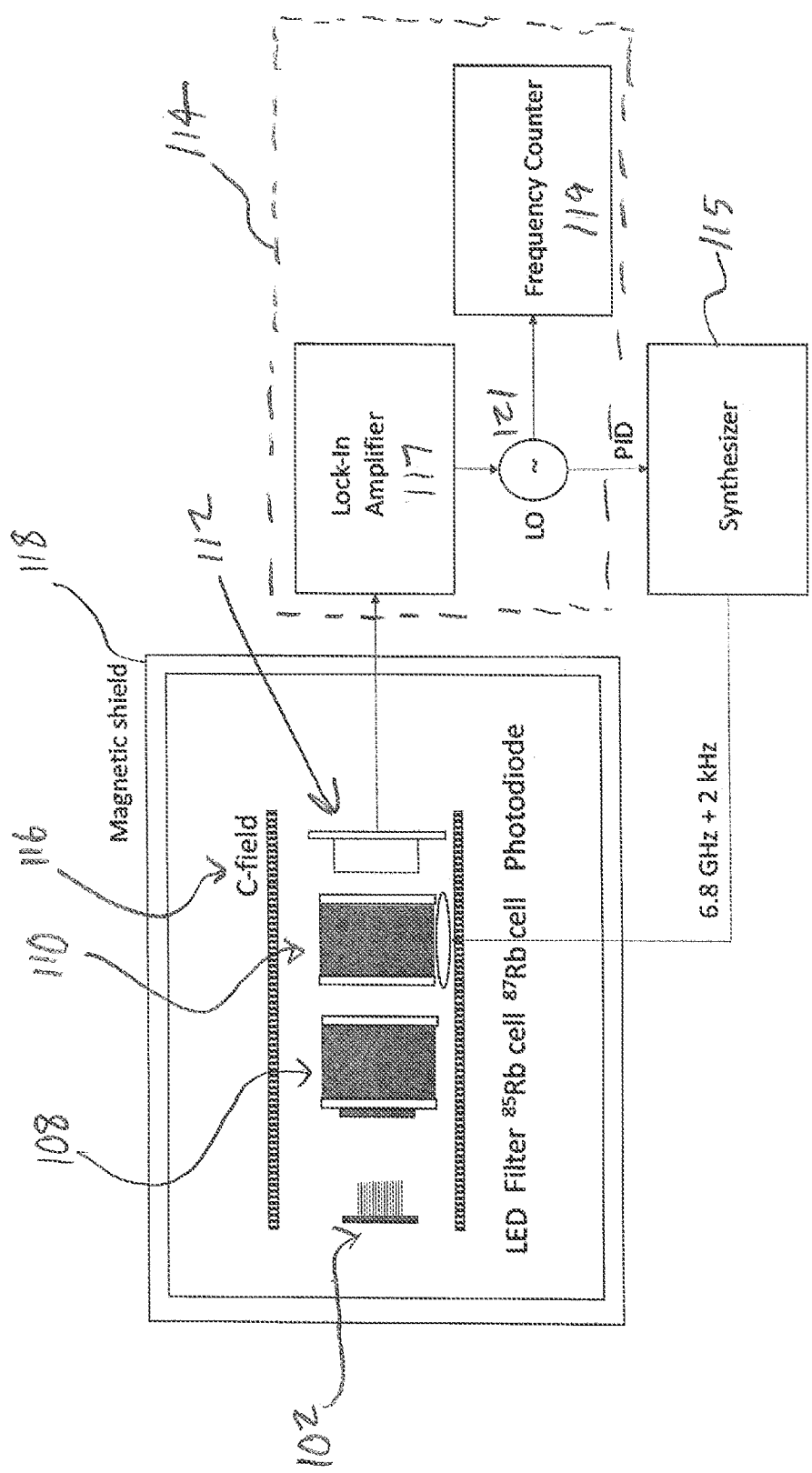
FIG. 2 shows a block diagram of a system for testing an atomic clock in accordance with one embodiment of the present disclosure.

With reference to FIG. 2, a system for testing an embodiment of the present disclosure is illustrated. The system shown in FIG. 2 is configured to test a tabletop-scale clock, but embodiments of the present disclosure include chip-scale atomic clocks. The non-limiting example shown in FIG. 2 includes a magnetic shield 118 and shows the relative position and orientation of the C-field 116. Light from the light source 102 passes through a filter (not shown) before entering the filter cell 108. The light that has passed through the filter cell 108 illuminates the resonance cell 110. In some embodiments of the present disclosure, the filter cell 108 and resonance cell 110 include different isotopes of the same element, and those different isotopes can absorb light at different wavelengths. As a non-limiting example, the filter cell 108 can contain 85-Rb, which does not absorb light that is resonant with 87-Rb. The light that passes through the filter cell 108 can be light that is of a suitable wavelength to excite the resonance cell 110 containing 87-Rb. According to some embodiments of the present disclosure, the optical filter 106 and the filter cell 108 are configured to cause a specific transition between energy levels in the atoms of the resonance cell 110.

The detector 112 can detect the emitted signal from the hyperfine transitions inside the resonance vapor cell 110. The detector 112 can be any kind of detector 112 that is configured to detect the emission corresponding to the hyperfine transition in the resonance vapor cell. In some embodiments, the detector 112 is a photodiode.

FIG. 2 further illustrates a control and detection system 114 including a Lock-in Amplifier 117, Frequency Counter 119, and Synthesizer 115 configured to control the clock and measure the output of the clock. The input to the control and detection system 114 can be a signal from the detector 112. The control and detection system 114 can also include a local oscillator 121. The control and detection system 114 can determine difference in frequency between the atomic hyperfine transition and the local oscillator 115 based on the output of the detector 112. The control and detection system 114 can tune the local oscillator 115 to remain in resonance with the atomic transition. In some embodiments of the present disclosure, the control and detection system 114 can be configured to implement a proportional integral derivative (PID) loop that tunes the local oscillator 115 to remain in resonance with the atomic transition. In some embodiments of the present disclosure, the control and detection system 114 can be configured to implement a phase locked loop (PLL). As a non-limiting example, the PLL can be controlled by the PID control In some embodiments of the present disclosure, a magnetic field 116 can be applied to null the background field and attain a narrow magnetic resonance linewidth. This field 116 can be referred to as the "C field." The C-field 116 can produce a narrow magnetic resonance linewidth and clock stability. Embodiments of the present disclosure can also include a magnetic shield 118 that encloses some or all of the components. For example, in one embodiment of the present disclosure, the magnetic shield 118 can encompass the LED 102 or quantum dot laser 102, resonance vapor cell 110, narrowband optical filter (not shown), and optical detector 112. Throughout the present disclosure the term "physics package" is used to refer to the resonance cell, filter cell, light source (e.g. LED or laser), filter, and detector. The physics package can also include heaters, a housing that encloses part or all of the other components of the physics package, and suspensions. In some embodiments of the present disclosure high magnetic field control can be used to achieve a low drift clock signal. In some embodiments of the present disclosure the magnetic shield 118 can be used to minimize and/or reduce the size of the magnetic field in physics package. A magnetic field can shift and broaden energy levels. Minimizing or reducing the size of the magnetic field inside the physics package. Some embodiments of the present disclosure can be configured to minimize or reduce the magnetic field inside the physics package to obtain a specific atomically referenced frequency. A non-limiting example of an atomically referenced frequency is the standardized atomically referenced frequency for the element that is used in the resonance vapor cell 110.

The arrangement of the components in FIGS. 1 and 2 are intended as non-limiting examples of the relationships between the components.

Figure 3:
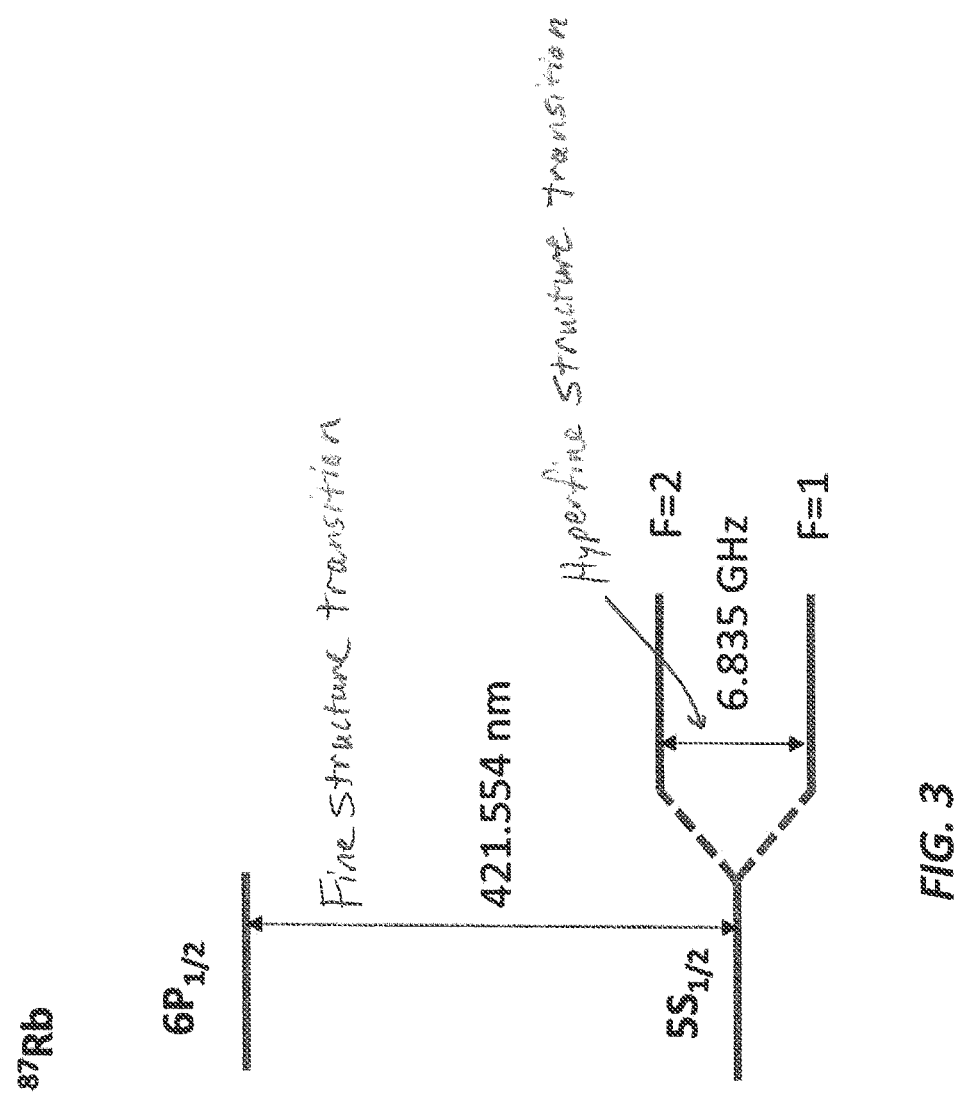
FIG. 3 is an illustration of the energy levels associated with the 421 nm transition in a Rubidium atom.

FIG. 3 illustrates the 421 nm transition of Rubidium. The 421 nm transition of Rubidium is a fine structure transition. The 6.8 GHz transition corresponds to the hyperfine structure transition that is driven by a microwave field that is applied at the 6.8 GHz transition frequency. The 6.8 Ghz transition illustrated and the associated microwave field applied at the 6.8 GHz transition frequency are intended only as non-limiting examples. Some embodiments of the present disclosure are configured to measure time based on this transition and the associated emissions. Alternative materials (and therefore transitions and transition frequencies) are possible in other embodiments of the present disclosure. For example, embodiments of the present disclosure may include Cesium instead of or in addition to Rubidium.

As a non-limiting example implementation, one embodiment of the present disclosure includes a tabletop clock with a 1 mm$^3$, $^{87}$Rb vapor cell. Different clock parameters can be optimized. Non-limiting examples of clock parameters that can be optimized include: cell temperatures of both cells, laser power, RF power, and LED temperature, current and magnetic fields (e.g., the C-field). The frequency stability of the clock can be determined by comparing it to the frequency stability of a second oscillator. Fractional frequency stability (Allan deviation) can also be used as a measure of clock stability. Some parameters of embodiments of the present disclosure may be similar to CSACs that rely on VCSEL lasers.

A CSAC based on an LED light source that can reach a fractional frequency stability of $10^{-11}$ at 1 hour and may pave a path to MEMS-clocks at much lower cost. It may also eliminate the stringent requirement on laser spectrum stability and the tedious burn-in times and it could also allow for much simpler packages than conventional laser-based designs.

The wavelengths of some currently available LEDs can cover the 421 nm transition in $^{87}$Rb ($5S_{1/2}$->$6P_{1/2}$) for optical pumping. While there have been few demonstrations of clock efforts using this wavelength [4], many important parameters are known [5] and are not expected to affect the ground-state resonance. Due to the broad spectral width, a passive bandpass filter (0.1 nm width) followed by an $^{85}$Rb filter cell can be used to enable optical pumping into a single hyperfine state (F=2). Once the atoms are pumped, an RF field is applied using the near field of a microfabricated loop antenna, similar to the CASC developed by the group of Mileti & Affolderbach [6]. The output light can be detected with a photodiode.

In addition, a narrow bandpass filter can be used to reduce the photon shot noise of the light. Calculations predict that an LED-based CSAC could reach the goal of the original CSAC program of a fractional frequency stability of $1\times10^{-11}$ while potentially meeting mass production goals.

For example, the short-term fractional frequency stability reached in a CSAC with a 1 mm$^3$ cell was $2.5\times10^{-10}/\tau^{1/2}$ [7] on the D2 line and $4\times10^{-11}/\tau^{1/2}$ [3] on the D1 line using coherent population trapping (CPT). Pellaton et al. have reached $2\times10^{-11}/\tau^{1/2}$ [6] with a near-field double-resonance approach in a microfabricated with a near-field double-resonance approach in a microfabricated cell (although the size is not given). A degradation in performance is expected since the photon shot noise will be higher due to access light outside the resonant frequencies. The optical linewidth will be broadened to 3-5 GHz with a buffer gas mixture. If the linewidth of the LED light after the filter is 0.1 nm, about 1% of the light will be on resonance. This can increase the photon shot noise by roughly 10× compared to the one using a VCSEL. Since the magnetic resonance linewidth is expected to remain similar (within a few kilohertz), a clock stability below $5\times10^{-10}/\tau^{1/2}$ is expected. This would be in alignment with the original CSAC specifications of a fractional frequency stability of $10^{-11}$ at 1 hour.

Figure 4:
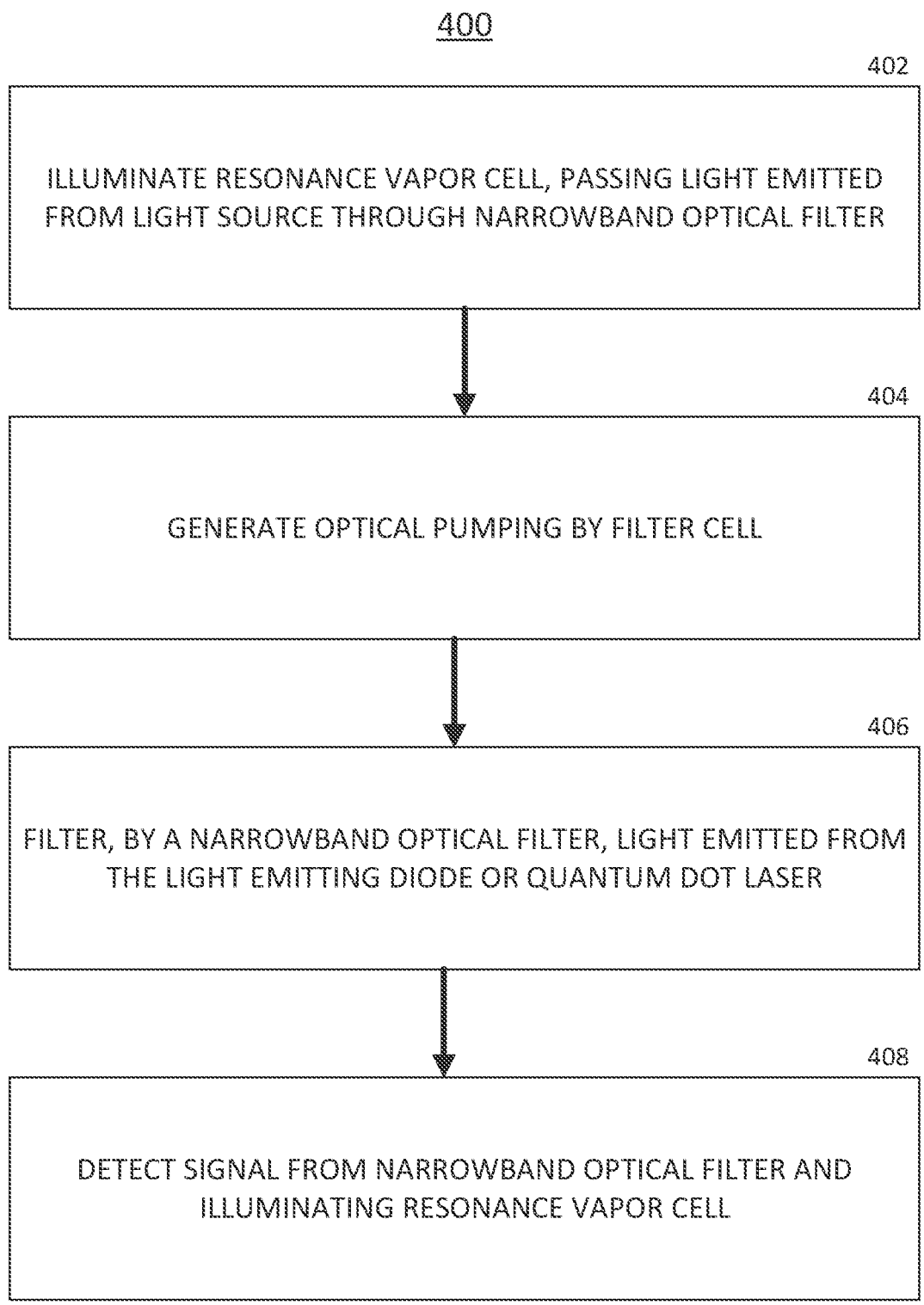
FIG. 4 is a flowchart illustrating a method of forming and/or using an atomic clock in accordance with one embodiment of the present disclosure.

FIG. 4 is a flowchart of a method for forming and/or using an atomic clock according to one embodiment of the present disclosure. Embodiments of the method 400 shown in FIG. 4 can be performed using the embodiments of the present disclosure illustrated in FIGS. 1 and 2. According to one embodiment, the method includes illuminating 402 a resonance vapor cell 110, which can generate 404 optical pumping. In some embodiments of the present disclosure, the resonance vapor cell 110 includes rubidium and in other embodiments of the present disclosure, the resonance vapor cell can include cesium. The resonance vapor cell 110 can be illuminated 402 by an LED 102 or quantum dot laser 102, or any other suitable illumination source that can emit a wavelength of light corresponding to a transition between energy levels in the resonance vapor cell 110. The light from the LED 102, quantum dot laser 102, or other illumination source is filtered 406 by an optical filter 106 before illuminating the resonance vapor cell 110. The resonance vapor cell 110 can emit a signal corresponding to a hyperfine transition frequency (e.g., the hyperfine transitions shown in FIG. 3) in response to illumination from the LED 102, quantum dot laser 102, or other light source. The signal can be detected 408 by an optical detector. In some embodiments of the present disclosure the signal corresponds to a hyperfine transition frequency of the resonance vapor cell, a non-limiting example of which is illustrated in FIG. 3.

In some embodiments, the method shown in FIG. 4 can include applying a C-field 116 as a magnetic field. The C-field 116 can produce a narrow magnetic resonance linewidth and clock stability. The method can also include providing a magnetic shield 118 that can enclose some or all of the components. For example, in one embodiment of the present disclosure, the magnetic shield 118 can encompass the LED 102 or quantum dot laser 102, resonance vapor cell 110, narrowband optical filter 106, and optical detector 112.

In some embodiments, the method can also include disposing a filter cell 108 between the LED 102, quantum dot laser 102, or other light source and the resonance vapor cell 110. The filter cell 108 can be used to filter the light that was filtered 406 by the narrowband optical filter 106. In some embodiments of the present disclosure the element inside the resonance vapor cell 110 can be the same element that is inside the filter cell 108. Non-limiting examples of materials that can be used as part of the filter cell 108 include rubidium and cesium. It should be understood that when the same element is used in both the resonance vapor cell 110 and filter cell 108, the isotope of that element used in the resonant vapor cell 110 can be different than the isotope of the same element that is inside the filter cell 108.

The detector 112 used to detect the emitted signal can be any detector 112 that is configured to detect the emission corresponding to the hyperfine transition in the resonance vapor cell 110. In some embodiments, the detector 112 can be a photodiode.

The various embodiments described above are provided by way of illustration only and should not be construed to limit the scope of the present disclosure. Those skilled in the art will readily recognize that various modifications and changes may be made to the present disclosure without following the example embodiments and implementations illustrated and described herein, and without departing from the spirit and scope of the disclosure and claims here appended Therefore, other modifications or embodiments as may be suggested by the teachings herein are particularly reserved.

LIST OF REFERENCES

[1] Gerginov, V., et al., *Long-term frequency instability of atomic frequency references based on coherent population trapping and microfabricated vapor cells*. Journal of the Optical Society of America B, 2006. 23(4): p. 593-597.

[2] Venkatraman, V., et al. *LTCC integrated miniature Rb discharge lamp module for stable optical pumping in miniature atomic clocks and magnetometers*. in *Design and Technology in Electronic Packaging (SIITME)*, 2012 IEEE 18th International Symposium for. 2012.

[3] Knappe, S., et al., *Atomic vapor cells for chip-scale atomic clocks with improved long-term frequency stability*. Optics Letters, 2005. 30(18): p. 2351-2353.

[4] Zhang, S., et al., *Compact Rb optical frequency standard with 10-15 stability*. Review of Scientific Instruments, 2017. 88(10): p. 103106.

[5] Aldridge, L., P. L. Gould, and E. E. Eyler, *Experimental isotope shifts of the 5 $^2S_{1/2}$ state and low-lying excited states of Rb*. Physical Review A, 2011. 84(3): p. 034501.

[6] Pellaton, M., et al., *Study of laser-pumped double-resonance clock signals using a microfabricated cell*. Physica Scripta, 2012. 2012(T149): p. 014013.

[7] Knappe, S., et al., *A microfabricated atomic clock*. Applied Physics Letters, 2004. 85(9): p. 1460-1462.

What is claimed is:

1. An atomic clock comprising:
a light source configured to illuminate a resonance vapor cell;
a narrowband optical filter disposed between the light source and the resonance vapor cell and arranged such that light emitted from the light source passes through the narrowband optical filter and illuminates the resonance vapor cell, wherein the resonance vapor cell is configured to emit a signal corresponding to a hyperfine transition frequency in response to illumination from the light source;
a filter cell comprised at least partially of Rubidium, the filter cell disposed between the light source and the resonance vapor cell and configured to generate optical pumping; and
wherein the narrowband optical filter is disposed on a surface of the filter cell;
an optical detector configured to detect the emitted signal corresponding to the hyperfine transition frequency;
wherein the atomic clock is configured to apply a C field as a magnetic field to produce narrow magnetic resonance linewidth and produce clock stability through low drift clock signal.

2. The atomic clock of claim 1, wherein the light source comprises a light emitting diode configured to illuminate the resonance vapor cell.

3. The atomic clock of claim 1, wherein the light source comprises a quantum dot laser configured to illuminate the resonance vapor cell.

4. The atomic clock of claim 1, wherein the resonance vapor cell is comprised at least partially of Rubidium or Cesium.

5. The atomic clock of claim 1, wherein the atomic clock is configured as a chip-scale atomic clock.

6. An atomic clock comprising:
a light emitting diode or quantum dot laser, configured to illuminate a resonance vapor cell;
a narrowband optical filter disposed on a surface of a filter cell disposed between the light emitting diode or quantum dot laser and the resonance vapor cell and arranged such that light emitted from the light emitting diode or quantum dot laser passes through the narrowband optical filter and illuminates the resonance vapor cell, wherein the resonance vapor cell is configured to emit a signal corresponding to a hyperfine transition frequency in response to illumination from the light emitting diode or quantum dot laser and wherein the filter cell is comprised at least partially of Rubidium; and
an optical detector configured to detect the emitted signal corresponding to the hyperfine transition frequency,
wherein the atomic clock is configured to apply a C field as a magnetic field to produce narrow magnetic resonance linewidth and produce clock stability through low drift clock signal.

7. The atomic clock of claim 6, wherein the resonance vapor cell is comprised at least partially of Rubidium or Cesium.

8. The atomic clock of claim 6, wherein the atomic clock is configured as a chip-scale atomic clock.

9. The atomic clock of claim 6, wherein the optical detector comprises a photodiode.

10. A method relating to an atomic clock, comprising:
illuminating, by a light emitting diode or quantum dot laser, a resonance vapor cell, wherein the resonance vapor cell is configured to emit a signal corresponding to a hyperfine transition frequency in response to illumination from the light emitting diode or quantum dot laser;
generating optical pumping by a filter cell disposed between the light emitting diode or quantum dot laser and the resonance vapor cell
filtering, by a narrowband optical filter, light emitted from the light emitting diode or quantum dot laser such that the emitted light passes through the narrowband optical filter and illuminates the resonance vapor cell;
detecting, by an optical detector, the emitted signal corresponding to the hyperfine transition frequency;
providing a magnetic shield that encompasses at least the light emitting diode or quantum dot laser, resonance vapor cell, narrowband optical filter, and optical detector, and wherein the magnetic shield is configured to minimize a magnetic field causing broadening or shifting of energy levels; and applying a C field as a magnetic field to produce narrow magnetic resonance linewidth and produce clock stability through low drift clock signal.

11. The method of claim 10, wherein the filter cell is comprised at least partially of Rubidium.

12. The method of claim 10, wherein the resonance vapor cell is comprised at least partially of Rubidium.

13. The method of claim 10, wherein the resonance vapor cell is comprised at least partially of Cesium.

14. The method of claim 10, wherein the optical detector comprises a photodiode.

* * * * *